United States Patent [19]

Weese et al.

[11] 4,217,424

[45] Aug. 12, 1980

[54] IMPACT MODIFICATION OF POLYGLUTARIMIDES

[75] Inventors: Richard H. Weese, Washington Crossing; Thomas M. Yarnell, Willow Grove, both of Pa.

[73] Assignee: Rohm and Haas Company, Philadelphia, Pa.

[21] Appl. No.: 36,951

[22] Filed: May 7, 1979

[51] Int. Cl.² .................. C08L 9/00; C08L 13/00; C08L 51/04; C08L 69/00
[52] U.S. Cl. ................................. 525/67; 525/71; 525/84; 525/85; 525/86
[58] Field of Search ............. 525/66, 67, 71, 73, 525/77, 205

[56] References Cited

U.S. PATENT DOCUMENTS

| | | | |
|---|---|---|---|
| 3,130,177 | 4/1964 | Grabowski | 525/67 |
| 3,162,695 | 12/1964 | Grabowski | 525/67 |
| 4,082,895 | 4/1978 | Backderf et al. | 525/67 |

FOREIGN PATENT DOCUMENTS 848486  5/1977  Belgium .

*Primary Examiner*—Walter C. Danison
*Attorney, Agent, or Firm*—Michael B. Fein

[57] ABSTRACT

A synergistic blend of impact strength modifiers for polyglutarimides, and a process for impact modification of polyglutarimides is disclosed.

7 Claims, No Drawings

IMPACT MODIFICATION OF POLYGLUTARIMIDES

BACKGROUND OF THE INVENTION

1. Field of the Invention

This invention relates to impact modification of polyglutarimides.

2. Description of the Prior Art

Mueller patent application Ser. No. 967,663 of Dec. 8, 1978 describes polyglutarimides impact modified with a synergistic combination of a butadiene based or an acrylic based multiple stage polymer and certain levels of polycarbonates.

It is an object of the invention to achieve still further improvements of impact strength properties in polyglutarimides than achieved by the prior art.

SUMMARY OF THE INVENTION

These objects and others as will become apparent from the following disclosure are achieved by the present invention which comprises a process for improving the impact strength of polyglutarimides comprising blending therewith a mixture of at least two multiple stage polymer impact modifiers, said impact modifiers having rubbery cores and hard polymer shells, one of said impact modifiers having a core polymerized from butadiene and the second of said impact modifiers having a core polymerized from $C_2$-$C_6$ alkyl acrylate. In another aspect this invention comprises the compositions so produced.

DETAILED DESCRIPTION OF THE INVENTION PREFERRED EMBODIMENTS

The polyglutarimides to be used in this invention are any known in the art but the ones produced in accordance with Kopchik's Belgian patent No. 848,486 are so superior to any other known to us that they are greatly preferred.

The preferred glutarimide polymers are those which have been prepared from acrylic polymers such as poly(methyl methacrylate) and copolymers thereof by reaction in accordance with the aforementioned Kopchik invention with ammonia or methylamine so that about 1 to 100% of the acrylic ester groups are imidized. The optimum results are obtained with degrees of imidization of about 20 to 100%. The weight average molecular weights of the glutarimide polymers are typically about 100,000 to 200,000.

In this invention, both butadiene and acrylic based multiple stage polymers are necessary, contrary to the prior art such as Mueller Ser. No. 967,663.

The butadiene based multiple stage polymer can be an MBS (methacrylate-butadiene-styrene type or an ABS (acrylonitrile-butadiene-styrene) type. For example multiple stage polymers having a butadiene-styrene first stage, a styrene second stage, and a methyl methacrylate-styrene final stage or an acrylonitrile final stage can be used.

The acrylic based multiple stage polymer can have a crosslinked butyl acrylate first stage and a methyl methacrylate final stage.

The final stage or stages of the multiple stage polymers can be polymerized from methyl methacrylate, or blends of methyl methacrylate with other monomers such as styrene, acrylonitrile and the like.

Ratios of rubber stage to hard stage can be varied from about 1:1 to about 9:1.

One suitable way to prepare the two multiple stage polymers is to polymerize the final stage or stages in the presence of a mixture of the butyl acrylate first stage and the butadiene-styrene first state, and coisolating the resultant mixture of multiple stage polymers.

Suitable total amounts of multiple stage polymers are typically about 5–40% by weight, based on blend of multiple stage polymers, polyglutarimide, and any optional polycarbonate. Preferably, the multiple stage polymers constitute about 15 to 35% of this blend.

Optionally, polycarbonates can be present in the blend for further enhancement of impact properties. The polycarbonates which can be employed are any having a molecular weight (weight average) of about 20,000 to 1 million, preferably about 20,000 to 40,000. Polycarbonates are commercial materials.

The polyglutarimide, multiple stage polymers, and optional polycarbonate are blended by melting to form an alloy. Generally, the ingredients are dry blended with suitable stabilizers, pigments, fillers reinforcing agents or other additives, and then the blend is extruded at an elevated temperature, e.g., around 450° to 550° F., and the resultant melt blend can either be fed directly to an injection molding machine, or cooled and granulated for subsequent processing.

The following examples in which all parts and percentages are by weight unless otherwise indicated are presented to illustrate the few non-limiting embodiments of the invention.

EXAMPLES

In the following examples, the compositions were prepared by dry blending the ingredients with suitable lubricants and stabilizers and compounding on a one inch Killion extruder at 475° to 550° F., and injection molding on a Newbury injection molding machine. Physical properties were assessed by standard ASTM procedures.

EXAMPLES 1 TO 6

In this series of experiments the following ingredients were blended in the ratios indicated in Table 1 and the physical properties were tested, with results also indicated in Table 1. The polyglutarimide was prepared in accordance with Kopchik Belgian patent 848,486 from a methyl methacrylate polymer to a degree of imidization of 88 to 92%. The butadiene-based multiple stage polymer had a stage which is a copolymer of butadiene and styrene, a second stage of styrene and a final stage copolymer of methyl methacrylate, acrylonitrile and styrene with a weight ratio of 73.63/3.87//11.01//3.83/3.83/3.83 (double slashes separate stages, single slashes separate monomers in same stage). The all acrylic multiple stage polymer had a poly(butyl acrylate) first stage crosslinked with 1% butylene glycol diacrylate, and 20% of a final stage of poly(methyl methacrylate). The polycarbonate was Mobay "Merlon M-50". The results of these experiments are reported in Table 1 and show the synergistic results achieved by using a combination of both butadiene-based and all acrylic multiple stage polymers.

EXAMPLES 7 TO 10

This series of experiments shows the effect of reducing the polycarbonate content when substituting a blend of impact modifiers for each of the impact modifiers used separately. The materials used in Example 7 through 10 are the same as those used in Examples 1 through 6, except that the butadiene based impact modifier has the following composition: butadiene/styrene//styrene/acrylonitrile/methyl methacrylate of the weight ratio 73.63/3.87//14.84/3.83/3.83. The results are reported in Table 2.

EXAMPLES 11 AND 12

In this series of experiments the same materials as were used in Examples 1 to 6 were used but varying the ratios of the two modifiers. The results are reported in Table III.

EXAMPLE 13

In this example, the procedure of Examples 7 to 10 was followed except that the modifier system was prepared by polymerizing 25 parts methyl methacrylate onto 75 parts of a 50/50 mixture of butyl acrylate rubber and butadiene-styrene rubber. The butyl acrylate rubber was crosslinked with 1% of butylene glycol diacrylate. The butadiene rubber was a copolymer of butadiene and styrene in a 95/5 ratio. The ratios of components were 55.5 parts polyglutarimide, 32.0 parts of the above-mentioned modifier system, and 12.5 parts polycarbonate; the properties are reported in Table II.

TABLE I

| Composition | 1 | 2 | 3 | 4 | 5 | 6 |
|---|---|---|---|---|---|---|
| Polyglutarimide | 45 | 45 | 45 | 48 | 48 | 48 |
| Butadiene-Based Multiple Stage Polymer | 35 | — | 17.5 | 35 | — | 17.5 |
| All-Acrylic Multiple Stage Polymer | — | 35 | 17.5 | — | 35 | 17.5 |
| Polycarbonate | 20 | 20 | 20 | 17 | 17 | 17 |
| Notched Izod Impact, $\frac{1}{8}''$, ft-lbs/in | 3.0 | 4.1 | 4.4 | 3.0 | 2.7 | 4.1 |
| Gardner Impact (VHI, in-lbs | 80 | 60 | 161 | 73 | 40 | 91 |
| Tensile Impact | 89 | 96 | 120 | 112 | 61 | 103 |
| Elongation, % | 26 | 31 | 45 | 17 | 22 | 24 |

TABLE II

| Composition | 7 | 8 | 9 | 10 | 13 |
|---|---|---|---|---|---|
| Polyglutarimide | 45 | 45 | 50 | 55 | 55.5 |
| Butadiene-Based Impact Modifier | 35 | — | 17.5 | 17.5 | 16.0 |
| All-Acrylic Impact Modifier | — | 35 | 17.5 | 17.5 | 16.0 |
| Polycarbonate | 20 | 20 | 15 | 10 | 12.5 |
| Notched Izod Impact, $\frac{1}{8}''$, ft-lbs/in | 3.0 | 4.1 | 3.9 | 3.0 | 3.3 |
| Gardner Impact (VHIT), in-lbs | 80 | 60 | 320 | 320 | 250 |
| Tensile Strength at Yield | — | — | 6095 | 6980 | 7190 |
| at Break | 7300 | 6900 | 6110 | 5890 | 7140 |
| Tensile Modulus × $10^5$ | 2.83 | 2.90 | 2.80 | 3.35 | 3.20 |
| Elongation, % at Break | 26 | 31 | 34 | 20 | 48 |

TABLE III

| Composition | 11 | 12 |
|---|---|---|
| Polyglutarimide | 45 | 50 |
| Butadiene-Based Impact Modifier | 10.5 | 24.5 |
| All-Acrylic Impact Modifier | 24.5 | 10.5 |
| Polycarbonate | 20 | 15 |
| Notched Izod Impact, $\frac{1}{8}''$, ft-lbs/in | 5.2 | 3.4 |
| Gardner Impact (VHIT), in-lbs | 121 | 191 |

It is claimed:

1. Process for improving the impact strength of polyglutarimides comprising blending therewith a mixture of at least two multiple stage polymer impact modifiers, said impact modifiers having rubbery cores and hard polymer shells, one of said impact modifiers having a core polymerized from butadiene and the second of said impact modifiers having a core polymerized from $C_2$–$C_6$ alkyl acrylate.

2. Process of claim 1 wherein the hard polymer shells of said impact modifiers are polymerized from a monomer system comprised of one or more monomers selected from the group consisting of methyl methacrylate, styrene, and acrylonitrile.

3. Process of claim 1 wherein each of said impact modifiers comprises about 1 to 100 parts by weight per 100 parts polyglutarimide.

4. Process of claim 1 further including about 1 to 100 parts by weight of polycarbonate.

5. Process of claim 1 wherein said polycarbonate has a molecular weight of about 20,000 to 32,000, number average.

6. Process of claim 1 wherein said polyglutarimide is prepared by imidizing a polymer or copolymer of methyl methacrylate, and about 50 to 92%, by mole, of the methacrylate groups are imidized.

7. Composition produced by the process of claims 1, 2, 3, 4, 5 or 6.

* * * * *